Oct. 19, 1926.
C. O. ROHDE
1,603,412
COUPLING
Filed June 3, 1924
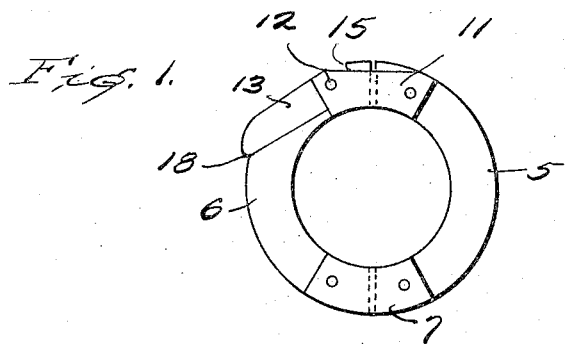
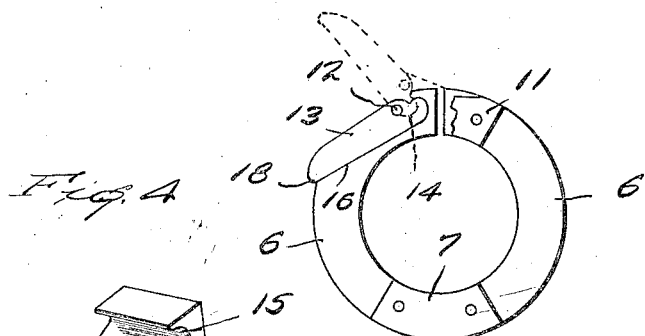
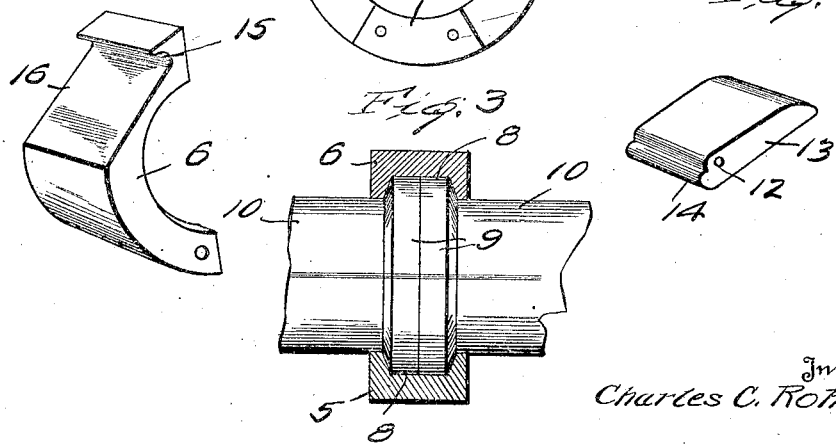
Inventor
Charles C. Rohde
Witness
By Richard B. Owen,
Attorney Patented Oct. 19, 1926.

1,603,412

UNITED STATES PATENT OFFICE.

CHARLES C. ROHDE, OF OGDEN, UTAH.

COUPLING.

Application filed June 3, 1924. Serial No. 717,661.

The present invention relates to couplings and has for one of its objects to provide a device of extremely simple, durable and inexpensive construction by which two sections may be connected together quickly and easily without the use of any tools and which may be easily disconnected either by hand or by use of a sharpened implement such as a screw driver or chisel.

A further object of the invention is to provide a device by which the coupling may join two sections in water-tight engagement and is adapted to a variety of usages.

My invention consists in the construction, arrangement and combination of the various parts of the device, whereby the objects contemplated are attained, as hereinafter more fully set forth, pointed out in the appended claims and illustrated in the accompanying drawings, in which:

Figure 1 is an elevation of a coupling embodying the features of my invention,

Figure 2 is a similar elevation thereof showing one of the upper links broken away, Figure 3 is a section therethrough showing the same associated with two pipe sections, Figure 4 is a detail perspective of one of the semi-circular members, and Figure 5 is a detail perspective of the locking lever.

Referring to the drawing in detail it will be seen that the device includes two semi-circular members 5 and 6 connected at adjacent ends by means of a pair of links 7 so that they may be hinged toward or away from each other. Each semi-circular member is provided with a channel on its inner face as is indicated at 8 for receiving flanges 9 of sections 10. The free end of section 5 has pivoted thereon a pair of links 11 which are pivoted at 12 to a lock lever 13 adjacent its cam shaped end 14. The semi-circular member 6 is provided adjacent its free end with a notch 15 for receiving the cam shaped end 14 of the lock lever 13 and a flat surface 16 leads from this notch 17 toward the mid portion of the member 6. Both the notch 15 and flat surface 16 are disposed on the outer periphery of the member 6.

The device is engaged about the sections 10 to be locked together so that the channels 8 of the members 5 and 6 receive the flanges or shoulders 9. The cam shaped end 14 of the lever 13 is then engaged in the notch 15 and the lever forced so that it lies on the flat surface 16. This lever is sufficiently long so that it will slightly overhang the flat surface 16 as is indicated at 18 in Figures 1 and 2. In order to release the coupling it is necessary to engage the extremity of the lock lever and fit the same to the dotted line position shown in Figure 2. It may be necessary to use a sharpened implement for this purpose such as a screw driver, chisel or the like in order to pry the lever up from the flat surface 16. By having the levers resting on the flat surface when in its locked position it is practically impossible to accidentally swing the same to an unlocked position as considerable effort is necessary to dislodge the lever from its locked position. My coupling device is particularly adapted for use in holding any two sections together which are provided with annular flanges at their meeting ends and the pipe sections 10 have only been illustrated by way of example. It is evident that the advantages of my device are found in its simplicity of construction, in its durability, in its ability to maintain itself in a locked position and in the small cost for which it may be made.

Changes in the details of construction may be resorted to without departing from the spirit or scope of the invention as hereinafter claimed or sacrificing any of its advantages.

Having thus described my invention, what I claim as new is:

1. In a coupling, the combination of a pair of complementary semi-circular sections, arcuate plates pivotally connecting the adjacent ends of said sections and confined within the contour of said sections, one of said sections being provided at its opposite end with a cut away portion and being further provided with a notch communicating with the said cut away portion, a pair of plates pivotally secured to the opposite sides of the other section and confined within the contour of the said sections said plates arranged to overlap the said cut away portion and notch and a lever arranged within the cut away portion and pivotally mounted between the overlapping ends of the said last mentioned plates, said lever being provided with an inner cam shaped end for engagement within the said notch.

2. The combination with a pair of complementary semi-circular sections, arcuate plates pivotally connecting the adjacent ends of the said sections, and confined within the contour of said sections, one of said sections being provided at its opposite end with a cut away portion and a hook-like extension overlapping the said cut away portion and formed in the contour of said section of a pair of plates pivotally secured to the opposite sides of the other section adjacent the free end thereof, said plates confined within the contour of the sections and arranged to overlap the said cut away portion and hook-like extension and a lever arranged within the said cut away portion and pivotally mounted between the overlapping ends of the said last mentioned plates, said lever being provided with a cam head adapted to be received under the said hook-like extension when the sections are in closed position.

In testimony whereof I affix my signature.

CHARLES C. ROHDE.